United States Patent [19]
Borchardt

[11] Patent Number: 5,815,871
[45] Date of Patent: Oct. 6, 1998

[54] RAMP MEMBER FOR LOADING DOCKS

[75] Inventor: Horst Borchardt, Wennigsen, Germany

[73] Assignee: Kurt Alten, Wennigsen, Germany

[21] Appl. No.: 556,010

[22] Filed: Nov. 13, 1995

[30] Foreign Application Priority Data

Nov. 12, 1994 [DE] Germany .......................... 44 40 485.9

[51] Int. Cl.⁶ ................................................. B65G 69/22
[52] U.S. Cl. ............................................ 14/71.1; 14/71.3
[58] Field of Search .................................... 14/69.5, 71.1, 14/71.3, 72.5

[56] References Cited

U.S. PATENT DOCUMENTS

| 3,877,102 | 4/1975 | Artzberger | 14/71.3 |
| 3,984,891 | 10/1976 | Weinmann | 14/69.5 |
| 4,328,602 | 5/1982 | Bennett | 14/71.3 |

FOREIGN PATENT DOCUMENTS 7423147  8/1974  Germany .

Primary Examiner—James A. Lisehora
Attorney, Agent, or Firm—Robert W. Becker & Associates

[57] ABSTRACT

A ramp member for a loading dock has a bridge member with a forward and and rearward end. The rearward end is connected to the loading dock so as to be pivotable about a horizontal axis. An extension plate is connected with a first end by a pivot connection to the forward end of the bridge member such that the extension plate is pivotable from a folded position into a working position. In the rest position of the bridge member the extension plate is folded and rests on an abutment for supporting the bridge member. The first end of the extension plate has a projection extending over its entire length. The projection has a cross-sectional shape of a circular ring sector with an inner and an outer radius. The outer surface of the projection is defined by the outer radius and the inner surface is defined by the inner radius. A profiled member with an interior space is connected to the forward end of the bridge member and extends over the entire length of the pivot connection. The projection extends into the interior space of the profiled member. The profiled member has a bead on which the projection is pivotably supported with its inner surface. The bead defines the pivot axis of the pivot connection. The inner radius of the projection and the exterior radius of the bead are identical.

7 Claims, 1 Drawing Sheet

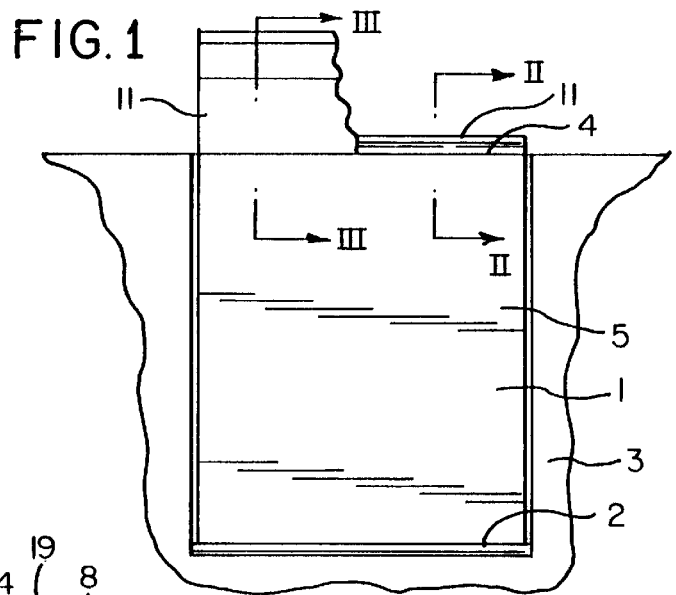
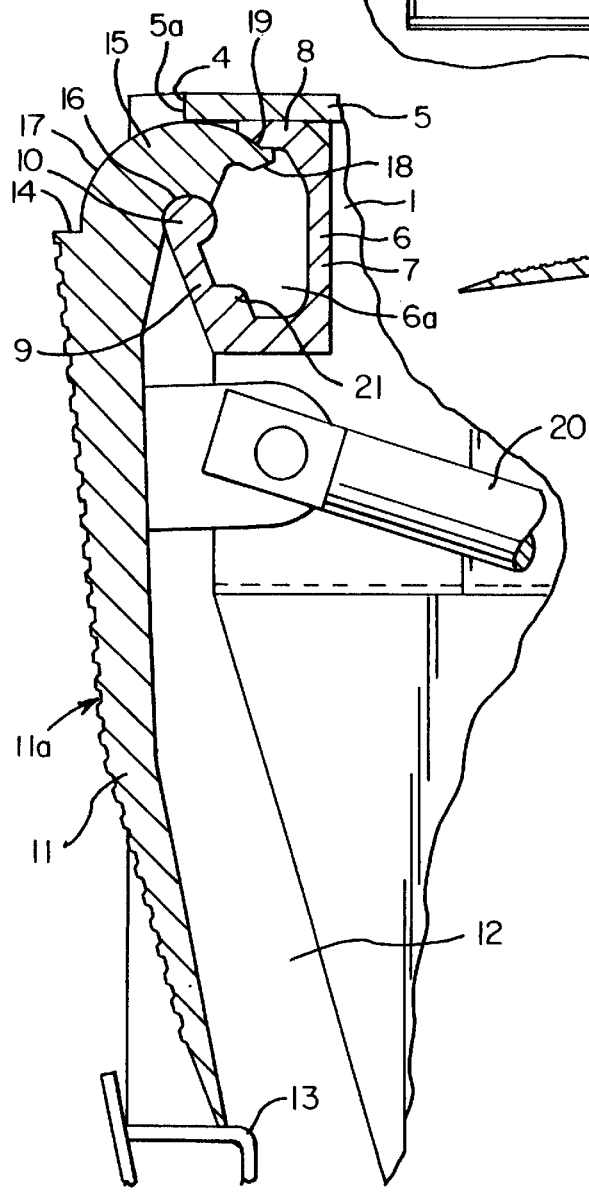
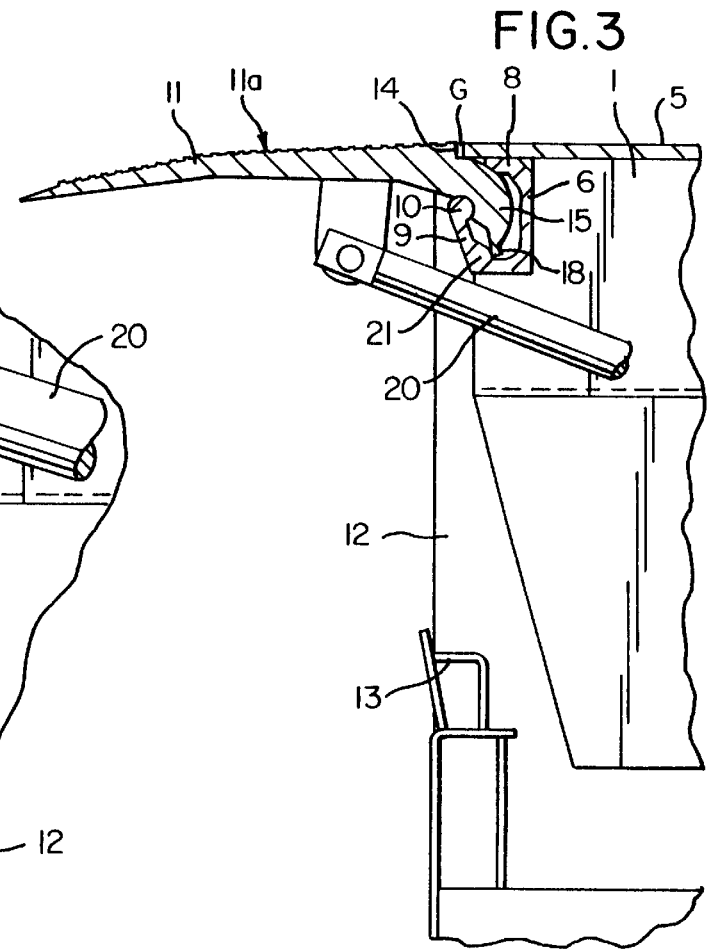

RAMP MEMBER FOR LOADING DOCKS

BACKGROUND OF THE INVENTION

The present invention relates to a ramp assembly for loading docks comprising a bridge member that is pivotably connected with one end to the loading dock and at its forward free end is provided with a foldable extension plate for resting the bridge member on a platform to be loaded or unloaded, whereby the bridge member in its rest position is supported with the folded extension plate on an abutment.

In their working position such extension plates are essentially positioned within the plane of the bridge member whereby the bridge member is supported with the extension plate on the platform to be loaded or unloaded such that the bridge member can follow any height adjustment of the platform.

Under these circumstances the extension plate and also the elements used for connecting the extension plate to the bridge member must be able to withstand the traffic load during the loading and unloading operation. Furthermore, these elements must also transmit in the rest position of the ramp member, i.e., with the extension plate in the folded position and with the bridge member positioned in the plane of the loading dock, forces that result from the general ramp traffic.

In the prior art the aforementioned connecting elements are in general in the form of a hinge with bolt and eye. However, these elements have the disadvantage that they are not effective over the entire width of the parts that are pivotably connected; instead, the eyes which are connected the bridge member or the extension plate extend only over a portion of the length of the pivot connection.

It is therefore an object of the present invention to provide a pivot connection for the extension plate having supporting elements that extend over the entire length of the pivot connection so that the pivot connection can withstand greater loads.

SUMMARY OF THE INVENTION

A ramp assembly for a loading dock according to the present invention is primarily characterized by:

A bridge member having a forward and a rearward end, wherein the rearward end in connected to a loading dock so as to be pivotable about a horizontal axis;

An extension plate having a first end and a second end, wherein the first end is connected with a pivot connection to the forward end of the bridge member such that the extension plate is pivotable from a folded position into a working position;

An abutment for supporting the bridge member in a rest position thereof, wherein in the rest position the extension plate is in the folded position and rests on the abutment for supporting the bridge member;

The first end of the extension plate having a projection extending over the entire length of the pivot connection;

The projection has a cross-sectional shape of a circular ring sector with an inner radius and an outer radius, the projection having an outer surface defined by the outer radius and inner surface defined by the inner radius;

A profiled member with an interior space connected to the forward end of the bridge member and extending over the entire length of the pivot connection, wherein the projection extends into the interior space of the profiled member;

The profiled member having a bead on which the projection is pivotably supported with its inner surface;

The bead and the projection forming the pivot connection, wherein the bead defines the pivot axis of the pivot connection; and The bead having an exterior radius, wherein the inner radius of the projection and the exterior radius of the bead are identical.

Preferably, the projection has a nose positioned at an end of the outer surface remote from the second end of the extension plate, and the profiled member has a first and a second stop cooperating with the nose. The first stop defines the folded position and the second stop defines the working position of the extension plate.

Advantageously, the profiled member is an upwardly open U-shaped member with a first and a second leg and a connecting bar extending between the first and the second legs. The first leg is positioned proximal to the extension plate and the bead is located at the first leg. The second leg is positioned distal to the extension plate and has an abutment surface for the outer surface of the projection.

In a preferred embodiment of the present invention, the second leg has an angled portion extending toward the first leg. The abutment surface is located at the angled portion.

Expediently, the angled portion is the first stop for the folded position.

Preferably, the second stop is positioned at a transition from the first leg into the connecting bar.

In yet another embodiment of the present invention the bridge member comprises a cover plate with an end face. The extension plate comprises a top surface having a stepped transition into the outer surface of the projection. The end face of the cover plate is spaced form the stepped transition in the working position of the extension plate. The extension plate in the working position is supported at the profiled member.

According to the present invention it is suggested to provide the extension plate at the edge which is facing the bridge member with an arc-shaped projection extending over the length of the pivot connection. This projection has a cross-section in the shape of a circular ring sector. The projection extends into the interior space of a profiled member which also extends over the entire length of the pivot connection and is connected to the bridge member. The profiled member comprises a bead for supporting the projection which bead at the same time defines the pivoting axis. The bead is shaped such that its outer radius matches the inner radius of the projection.

The projection and the bead supporting it together represent the pivot connection. Thus, the pivot elements (supporting elements) extend over the entire length of the pivot connection. Accordingly, correspondingly large contact surfaces between these two supporting elements are present which provide for a comparably small loading.

It is furthermore important that with the aforementioned pivot connection especially in the working position of the extension plate the load moments resulting from traffic thereacross are received by surface portions of the projection and the profiled member which are positioned at the upper and lower ends of the profiled member, i.e., have a relatively large spacing between one another.

BRIEF DESCRIPTION OF THE DRAWINGS

The object and advantages of the present invention will appear more clearly from the following specifications in conjunction with the accompanying drawings in which:

FIG. 1 shows a ramp assembly for loading docks in a top view whereby in order to facilitate the drawing the left portion shows the extension plate in its working position and the right portion shows the extension plate in its folded position;

FIG. 2 shows a sectional view along line II—II of FIG. 1; and

FIG. 3 shows a sectional view along the line III—III of FIG. 1.

DESCRIPTION OF PREFERRED EMBODIMENTS

The present invention will now be described in detail with the aid of a specific embodiment utilizing FIGS. 1 through 3.

The bridge member 1 of the ramp assembly is pivotably connected with its rearward end to the loading dock so as to be pivotable about a horizontal axis 2. The bridge member 1 is positioned within a cutout portion 12 of the loading dock 3 which is of the same rectangular shape as the bridge member 1. The forward edge 4 of the bridge member 1 is essentially defined by the cover plate 5 that forms the upper surface of the bridge member 1.

Below the cover plate 5, in particular in the area of the forward edge 4, a profiled member 6 is fixedly connected to the bridge member 1. The profiled member 6 is substantially U-shaped with an interior space 6a. However, the upwardly open profile is provided at the upper portion of the rearward leg 7 with an angled portion 8 which is oriented toward the forward edge 4 of the bridge member 1. The forwardly positioned leg 9 extends approximately vertically. At its free upper end it is provided with a bead 10 that has an outer surface in the shape of a cylinder mantle portion. The longitudinal axis of the bead 10 defines the pilot axis of the extension plate 11 at the bridge member 1.

The extension plate 11 in the working position according to FIG. 3 rests on a platform, for example, the platform of a truck to be loaded or unloaded. The bridge member 1 thus is essentially supported via the extension plate 11 on this platform. The bridge member 1 is also supported via the extension plate 11 in the folded position of the extension plate 11 shown in FIG. 2. The extension plate 11 is folded by about 90 degrees in the downward direction and rests with its tip on an abutment 13 which is positioned within the cutout 12 of the loading ramp. The bridge member 1 is then positioned within the plane of the loading dock, and the traffic on the loading dock is unimpeded.

The extension plate 11 has a top surface 11a with a stepped transition 14 the height of which corresponds to the wall thickness of the cover plate 5. Adjacent to the stepped transition 14 a projection 15 is provided at the extension plate which projection 15 has the cross-sectional shape of a circular ring sector the center point of which coincides with the longitudinal axis of the bead 10. The radius of the bead 10 corresponds to the radius of the inner surface of the projection 15.

The acting inner surface of the projection 15 which rests on the bead 10 for pivoting is identified with reference numeral 16 and the outer surface of the projection 15 is identified by reference numeral 17. This outer surface 17 has a transition at its rearward end into a projecting nose 18. The outer surface 17 has coordinated therewith an abutment surface 19 provided at the angled portion 8. The curvature of the abutment surface 19 corresponds to the curvature of the outer surface 17. The pivoting of the extension plate 11 is carried out with the aid of the pivot cylinder 20.

As can be seen in FIG. 2, in the approximately vertical position of the extension plate 11 the nose 18 ensures that the angled portion 8 is engaged from behind in order to prevent a further pivoting of the extension plate 11. The support action of the extension plate 11 in this position is ensured by the angled portion 8 which contacts the nose 18 and the surface 17. The contacting action is effective over the entire length of the extension plate 11 because the profiled member 6, on the one hand, and projection 15, on the other hand, have the same length as the extension plate 11.

In the working position of the bridge member 1 according to FIG. 3, the nose 18 rests at a thick portion 21 of the leg 9 that acts as a stop. At the same time abutment surface 19 of the angled portion 8 is also effective as an abutment below the cover plate 5. At this location the outer surface 17 of the projection 15 is resting. Since these contact or abutment locations have a relatively great spacing between them, the load moments resulting from the supporting action can be easily distributed.

It should be noted that the extension plate 11 may also be comprised of two or more sections positioned in the transverse direction of the bridge member 1 adjacent to one another. In this embodiment all of the active sections have the cross-sectional design shown in the drawings.

Furthermore it should be noted that an abutment of the stepped transition 14 at the end face 5a of the cover plate 5 is not required. At this location, as shown in FIG. 3, a small gap G can be provided. Accordingly, greater tolerances are acceptable for the manufacturer of the ramp member.

The present invention is, of course, in no way restricted to the specific disclosure of the specification and drawings, but also encompasses any modifications within the scope of the appended claims.

What I claim is:

1. A ramp assembly for a loading ramp, said ramp assembly comprising:

a bridge member having a forward and a rearward end, wherein said rearward end is connectible to a loading ramp so as to be pivotable about a horizontal axis;

an extension plate having a first end and a second end, wherein said first end is connected with a pivot connection to said forward end of said bridge member such that said extension plate is pivotable from a folded position into a working position;

an abutment for supporting said bridge member in a rest position thereof, wherein in said rest position said extension plate is in said folded position and rests on said abutment for supporting said bridge member;

said first end of said extension plate having a projection extending over the entire length of said pivot connection;

said projection having a cross-sectional shape of a circular ring sector with an inner radius and an outer radius, said projection having an outer surface defined by said outer radius and an inner surface defined by said inner radius;

a profiled member with an interior space connected to said forward end of said bridge member and extending over said entire length of said pivot connection, wherein said projection extends into said interior space of said profiled member;

said profiled member having a bead on which said projection is pivotably supported with said inner surface;

said bead and said projection forming said pivot connection, wherein said bead defines the pivot axis of said pivot connection; and said bead having an exterior radius, wherein said inner radius of said projection and said exterior radius of said bead are identical.

2. A ramp assembly according to claim 1, wherein said projection has a nose positioned at an end of said outer surface remote from said second end of said extension plate and wherein said profiled member has a first and a second stop cooperating with said nose, said first stop defining said folded position and said second stop defining said working position of said extension plate.

3. A ramp assembly according to claim 2, wherein said profiled member is an upwardly open U-shaped member with a first and a second leg and a connecting bar extending between said first and said second legs, wherein said first leg is positioned proximal to said extension plate and said bead is located at said first leg, wherein said second leg is positioned distal to said extension plate and has an abutment surface for said outer surface of said projection.

4. A ramp assembly according to claim 3, wherein said second leg has an angled portion extending toward said first leg and wherein said abutment surface is located at said angled portion.

5. A ramp assembly according to claim 4, wherein said angled portion is said first stop for said folded position.

6. A ramp assembly according to claim 3, wherein said second stop is positioned at a transition from said first leg into said connecting bar.

7. A ramp assembly according to claim 1, wherein:

said bridge member comprises a cover plate with an end face;

said extension plate comprises a top surface having a stepped transition into said outer surface of said projection;

said end face of said cover plate is spaced from said stepped transition in said working position of said extension plate; and said extension plate in said working position is supported at said profiled member.

* * * * *